(12) United States Patent
Kern et al.

(10) Patent No.: US 11,292,430 B2
(45) Date of Patent: *Apr. 5, 2022

(54) SYSTEMS AND METHODS FOR SECURING A VEHICLE AND ITS CONTENT AFTER A BAILOUT OPERATION

(71) Applicant: Ford Global Technologies, LLC, Dearborn, MI (US)

(72) Inventors: Robert S. Kern, Eastpointe, MI (US); Adam Rainey, Chicago, IL (US); Steve Skikun, Commerce Township, MI (US); Arie Groeneveld, Bloomfield Hills, MI (US); William Gubing, Northville, MI (US); Jon Ohland, Northville, MI (US); Michael Ehlert, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/422,779

(22) Filed: May 24, 2019

(65) Prior Publication Data

US 2020/0369240 A1    Nov. 26, 2020

(51) Int. Cl.
*B60R 25/24* (2013.01)
*B60R 25/01* (2013.01)
(Continued)

(52) U.S. Cl.
CPC ............ *B60R 25/24* (2013.01); *B60R 25/003* (2013.01); *B60R 25/01* (2013.01); *B60R 25/045* (2013.01);
(Continued)

(58) Field of Classification Search
CPC ..... B60R 25/003; B60R 25/001; B60R 25/00; B60R 25/002; B60R 25/20;
(Continued)

(56) References Cited

U.S. PATENT DOCUMENTS

| 3,830,332 A | 8/1974 | Fontaine |
| 5,369,306 A | 11/1994 | Dib |

(Continued)

FOREIGN PATENT DOCUMENTS

| GB | 2553024 A | * 2/2018 | ............. B60R 25/06 |
| KR | 0130310 Y1 | * 12/1998 | |

OTHER PUBLICATIONS

Passive Entry Passive Start System (2 pages). Retrieved from https://www.valeo.com/en/passive-entry-passive-start-system/.
(Continued)

*Primary Examiner* — Nathnael Aynalem
(74) *Attorney, Agent, or Firm* — Frank Lollo; Eversheds Sutherland (US) LLP

(57) ABSTRACT

This disclosure is generally directed to systems and methods for automatically securing a vehicle such as a police truck or an emergency response vehicle and/or the contents of the vehicle after a bailout by the driver. In one exemplary method, a computer is configured to use a sensor system to detect that a driver of a vehicle has bailed out of the vehicle. Based at least in part on detecting that the driver has bailed out of the vehicle, the computer can execute operations such as automatically locking a door of the vehicle, logging out a computer located in the vehicle, locking a first component inside the vehicle such as a gun vault, and/or disabling an operation of another component in the vehicle such as a trunk release or an ignition switch.

16 Claims, 7 Drawing Sheets

(51) Int. Cl.
    *B60R 25/045*      (2013.01)
    *B60R 25/00*      (2013.01)
    *B60R 25/32*      (2013.01)
    *B60R 25/20*      (2013.01)
    *G07C 9/00*      (2020.01)
    *B60R 25/25*      (2013.01)
    *B60R 25/34*      (2013.01)

(52) U.S. Cl.
    CPC ........ *B60R 25/2036* (2013.01); *B60R 25/257* (2013.01); *B60R 25/32* (2013.01); *B60R 25/34* (2013.01); *G07C 9/00182* (2013.01); *B60Y 2200/116* (2013.01); *B60Y 2200/40* (2013.01); *G07C 2009/0019* (2013.01)

(58) Field of Classification Search
    CPC . B60R 25/2009; B60R 25/2063; B60R 25/30; B60R 25/34; B60R 25/403; B60R 25/08; B60R 25/083
    USPC ........................................................ 348/148
    See application file for complete search history.

(56) References Cited

U.S. PATENT DOCUMENTS

| | | | |
|---|---|---|---|
| 9,132,805 B1 * | 9/2015 | King | B60R 25/21 |
| 10,049,419 B1 | 8/2018 | Marron et al. | |
| 2004/0257208 A1 * | 12/2004 | Huang | B60R 25/33 |
| | | | 340/426.1 |
| 2007/0132553 A1 * | 6/2007 | Nakashima | B60R 25/24 |
| | | | 340/5.72 |
| 2011/0068895 A1 | 3/2011 | Gee et al. | |
| 2016/0063776 A1 * | 3/2016 | Chronowski | B60Q 9/00 |
| | | | 701/29.1 |
| 2019/0039571 A1 * | 2/2019 | Shimizu | B60R 25/20 |

OTHER PUBLICATIONS

Scorpion Track FleetLock (9 pages). Retrieved from https://www.scorpionauto.com/van-vehicle-security-immobiliser-fleet-lock/.

* cited by examiner

SYSTEMS AND METHODS FOR SECURING A VEHICLE AND ITS CONTENT AFTER A BAILOUT OPERATION

FIELD OF THE DISCLOSURE

This disclosure generally relates to vehicles, and more particularly relates to securing a vehicle and its content after a driver has bailed out of the vehicle.

BACKGROUND

Vehicles such as a police vehicle or an emergency response vehicle are often used in situations where an occupant of the vehicle has to bailout of the vehicle in a hurry. For example, a police vehicle may be used by a police officer in a high-speed chase that may end with the police officer bailing out of the police vehicle. In at least some cases, the police officer may have no time to turn off the engine, secure the contents of the police vehicle, and take the car keys when leaving the police vehicle. The police vehicle and contents inside are therefore vulnerable at this time to stealing, vandalizing, or misuse.

As another example, a fireman may drive a fire truck to a building that is on fire and bail out of the fire truck upon reaching the building. The fireman may have no time to protect the contents of the fire truck when entering the burning building to save people. The fireman may also leave the engine of the fire truck running so as to permit operation of various pieces of equipment for battling the fire. The fire truck and contents inside are vulnerable at this time to stealing, vandalizing, or misuse.

It is therefore desirable to provide systems and methods for automatically detecting an impending bailout from a vehicle such as a police truck or an emergency response vehicle and to safeguard the vehicle and its contents when the driver of the vehicle has bailed out.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
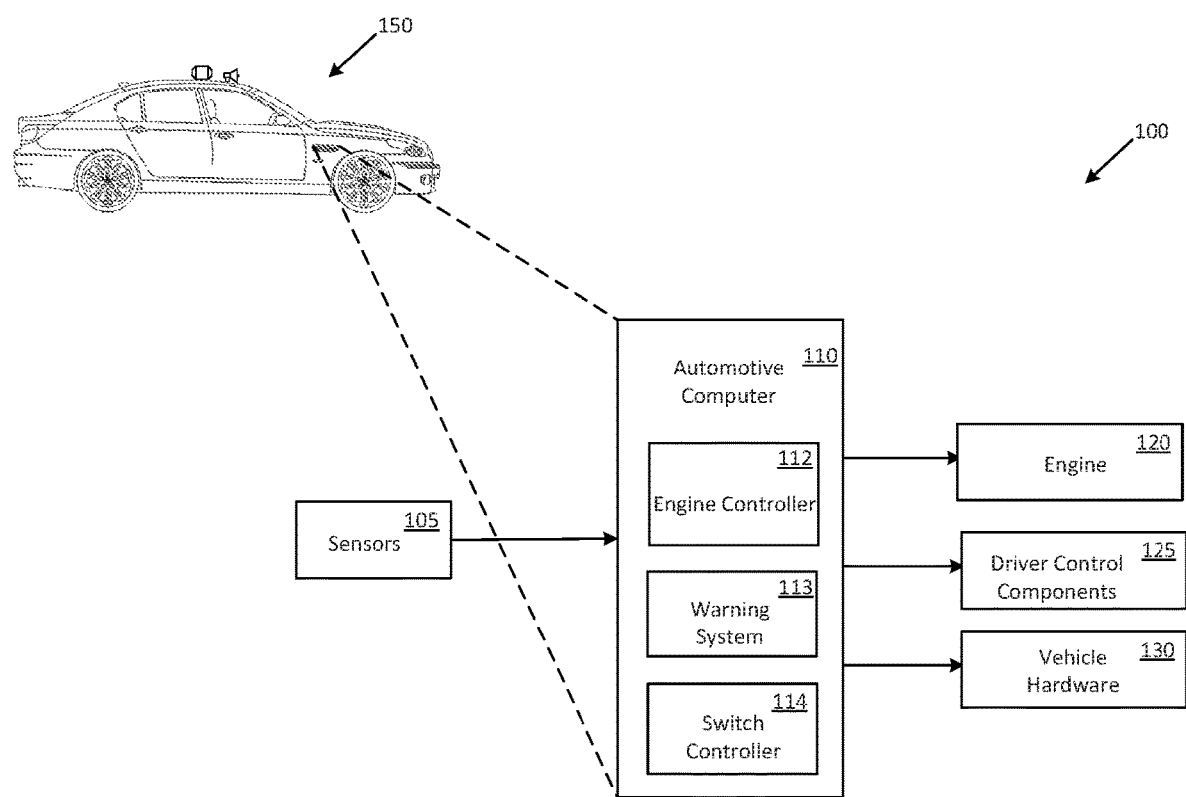
FIG. 1 illustrates an exemplary automotive computer that may be installed in a vehicle in accordance with the disclosure.

In terms of a general overview, certain embodiments described in this disclosure are directed to systems and methods for automatically detecting an impending bailout from a vehicle such as a police truck or an emergency response vehicle and safeguarding the vehicle and the contents of the vehicle when the driver of the vehicle has bailed out. In one exemplary method, a computer is configured to detect a driving pattern of the vehicle that would indicate that the driver of the vehicle is about to bail out. The driving pattern can include an acceleration sequence and a braking sequence that is indicative of a police chase or an emergency response situation. For example, a police vehicle may be involved in a high-speed chase where the vehicle is subjected to abrupt acceleration and braking sequences. In another exemplary method, the computer may determine that the driver of the vehicle is about to bail out based on detecting one or more cue words uttered by the driver or included in a conversation over a radio communications device between the driver and a person outside the vehicle. The computer may be further configured to execute one or more operations to secure the vehicle and/or contents of the vehicle after the driver has bailed out. For example, the computer may carry out operations such as locking one or more doors of the vehicle, locking a gun vault in the vehicle, and/or locking a glove compartment in the vehicle.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile," "vehicle," "car," and "truck" may be used interchangeably and should be understood in the context of the disclosure. Words such as "controls," "signals," "indication," and "information" may be used interchangeably and should be understood in the context of the disclosure. Furthermore, the word "information" as used herein may refer to various items such as digital data, analog data, audio content, video content, and/or messages. These items may be operated upon by a computer containing a processor. The phrase "pursuit mode of operation" as used herein is not limited to a police vehicle involved in a pursuit and can include other vehicles and operations such as an emergency vehicle (fire truck, ambulance etc.) being driven in response to an emergency. Phrases such as "a signal is transmitted" or "a door being opened" should not be construed exclusively in a singular sense. The phrase should be understood to also encompass "a set of signals" that may be transmitted (concurrently or sequentially) to one door and/or to multiple doors. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 illustrates an exemplary automotive computer 110 that may be installed in an engine compartment of a vehicle 150 (or elsewhere in the vehicle 150) as part of a system 100 in accordance with the disclosure. The vehicle 150 may be a police vehicle or may be any emergency response vehicle such as a fire truck or an ambulance and can include various items such as an engine 120, driver control components 125, vehicle hardware 130, and sensors 105. In some cases, the engine 120 may be customized to allow operating of the vehicle 150 in certain ways. For example, when the vehicle 150 is a police vehicle, the engine 120 may be customized for allowing the police vehicle to be used for activities such as a high-speed pursuit. More particularly, the transmission system of the police vehicle may be customized for high-speed pursuit by offering gear shifting sequences that are typically unavailable in civilian vehicles.

In one exemplary customization of a police vehicle, the transmission system is designed to maintain an upshifted gear state for a longer period of time and to maintain a downshifted gear state for a shorter period of time than would be feasible in a typical civilian vehicle. The longer upshifted gear state allows the police vehicle to travel at high speed without downshifting to a lower gear when the driver slows down a bit (to take a corner, for example). Complementarily, maintaining the downshifted gear state for a shorter period of time minimizes the amount of time taken by the police vehicle to upshift through various gears after the driver has executed a hard braking operation (to avoid an obstacle, for example). Saving time in this manner allows the police vehicle to catch up with a typical civilian vehicle that is being pursued.

The high-speed pursuit mode of operation may be provided in the vehicle 150 by configuring certain components of the vehicle 150 such as the gear box, the transmission equipment, and the engine controller 112 to operate in a customized manner. The engine controller 112, which may be part of the automotive computer 110, typically interacts with various components of the vehicle 150 such as the driver control components 125 and the sensors 105. A few examples of driver control components 125 may include a steering wheel, a brake pedal, an accelerator pedal, and a gear stick. A few examples of the sensors 105 may include brake sensors, accelerator sensors, and gear position sensors. During a typical driving operation, the engine controller 112 may receive a signal from the accelerator sensor to indicate that the driver of the vehicle 150 has depressed the accelerator pedal. The engine controller 112 can respond to this signal by computing a fuel-air mixture that would be suitable for accelerating the vehicle 150 to a speed desired by the driver. This fuel-air mixture is then provided to the engine 120. When the vehicle 150 includes an automatic gear mechanism, the engine controller 112 may determine the appropriate gear for use at the speed desired by the driver and configure the automatic gear control system accordingly. For example, the engine controller 112 may select a high gear ratio in the automatic gear control system to achieve the desired speed.

The engine controller 112 may receive a signal from the brake sensor to indicate that the driver of the vehicle 150 has depressed the brake pedal. The engine controller 112 can respond to this signal by computing a different fuel-air mixture that would be suitable for decelerating the vehicle 150 and/or for stopping the vehicle 150 in accordance with the brake pedal depression. When the vehicle 150 includes an automatic gear control system, the engine controller 112 may also determine the appropriate gear for use at the reduced speed and configure the automatic gear control system accordingly. For example, the engine controller 112 may select a low gear ratio in the automatic gear control system to slow down the vehicle 150.

When the vehicle 150 supports manual stick-shift operations, the engine controller 112 may receive a signal from a gear position sensor that indicates that the driver has selected a particular gear, a low gear, for example. The engine controller 112 responds to this signal by computing a fuel-air mixture that would be suitable for accelerating the vehicle 150 to a desired speed corresponding to the low gear and provides this fuel-air mixture to the engine 120. When the driver shifts to a higher gear, the engine controller 112 may modify the fuel-air mixture to the engine 120 for achieving a higher speed.

The switch controller 114 may receive signals from various sensors and use the information for activating various types of vehicle hardware 130. For example, the switch controller 114 may receive a signal from a rain sensor located in the windshield of the vehicle 150 and modify a rate of oscillation of a wiper assembly attached to the windshield of the vehicle 150 in accordance with an intensity of rainfall incident upon the windshield.

The warning system 113 may be coupled to various sensors such as engine performance sensors and fluid level sensors. Upon receiving information from a fluid level sensor of a low fluid level, for example, the warning system 113 may activate a warning light on the dashboard of the vehicle 150 to warn the driver of the low fluid level condition.

Figure 2:
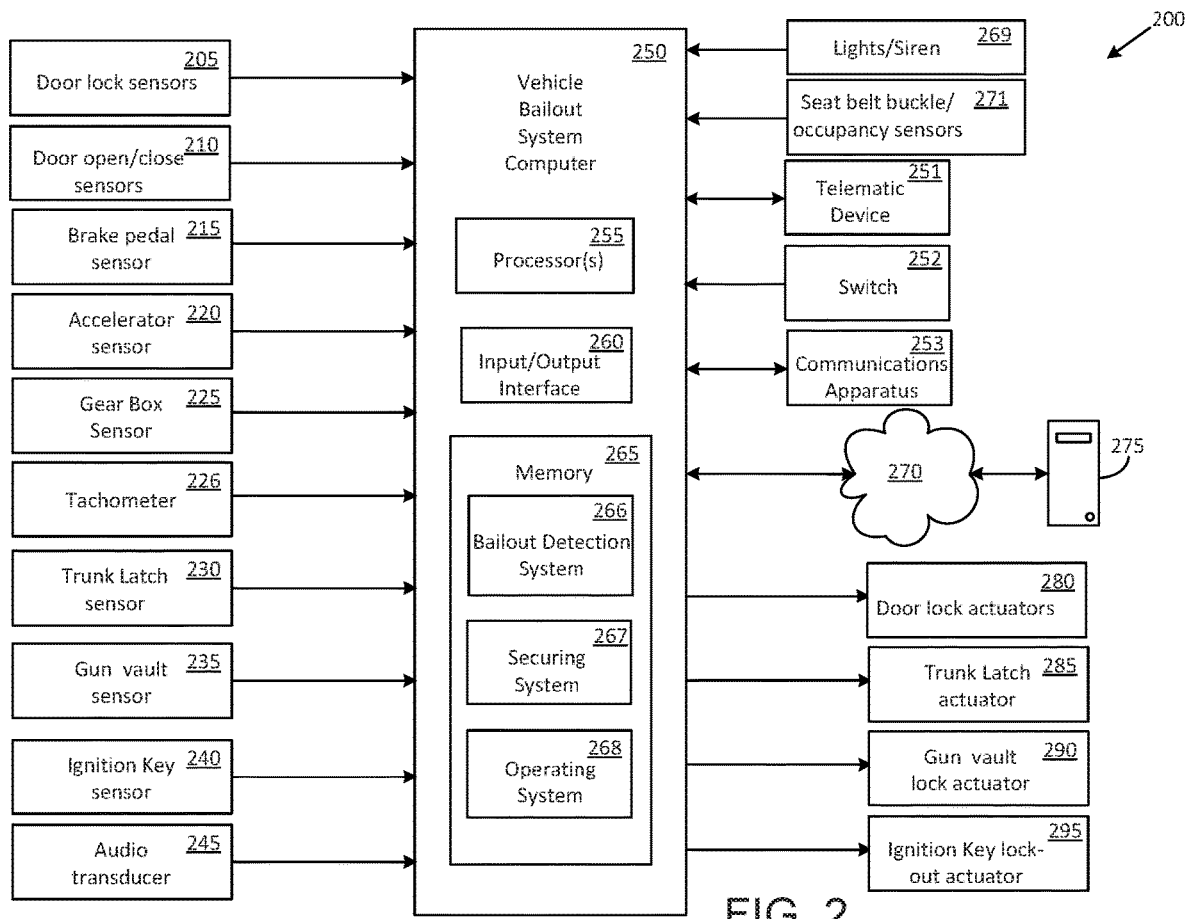
FIG. 2 illustrates an exemplary vehicle bailout system computer that may be used to detect an impending bailout from a vehicle in accordance with the disclosure.

FIG. 2 illustrates an exemplary vehicle bailout system computer 250 that may be a part of a system 200 installed in the vehicle 150 in accordance with the disclosure. In one exemplary implementation, the vehicle bailout system computer 250 is a standalone computer that is communicatively coupled to the automotive computer 110. In this exemplary implementation, the vehicle bailout system computer 250 may execute some operations independently and inform the automotive computer 110 of these operations. For example, an input/output interface 260 of the vehicle bailout system computer 250 may receive some types of signals from the engine controller 112 in the automotive computer 110 and use these signals to execute operations such as detecting an impending bailout from the vehicle 150 and/or securing the vehicle 150 and contents of the vehicle 150 after the driver has bailed out. The memory 265, which is one example of a non-transitory computer-readable medium, may be used to store programs in code and/or to store data for performing various vehicle bailout operations in accordance with the disclosure.

In another exemplary implementation, some or all components of the vehicle bailout system computer 250 may be shared with the automotive computer 110. In this implementation, a processor 255 of the vehicle bailout system computer 250 may be configured to execute computer-executable instructions stored in the memory 265 for performing various functions of the engine controller 112 as well as for performing vehicle bailout operations in accordance with the disclosure. Consequently, the memory 265 may be used not only for storing code and/or data associated with the engine controller 112 but also code and/or data for performing vehicle bailout operations in accordance with the disclosure.

The vehicle bailout system computer 250 may include several components such as one or more processors and one or more memory devices. In this illustrative example, the vehicle bailout system computer 250 includes the processor 255, which executes computer-executable instructions stored in the memory 265. The memory 265 may be used to store an operating system 268 and various code modules such as a bailout detection system 266 and a securing system 267. The input/output interface 260 may be configured to receive signals from various sources such as sensors and transducers provided in the vehicle 150. A few such exemplary sensors are shown in FIG. 2.

Of these exemplary sensors, the input/output interface 260 may receive status information from door lock sensors 205 that are provided in one or more doors of the vehicle 150. The status information may include an indication whether a door is locked or unlocked and may be used by the processor 255 to generate control signals for activating one or more door lock actuators 280. The door lock actuators 280 may be activated in order to lock one or more doors and secure the contents of the vehicle 150 after a bailout. In at least some cases, all the doors of the vehicle 150 may be locked automatically without intervention from the driver.

The input/output interface 260 may receive from the door open/close sensors 210 that are provided in one or more doors of the vehicle 150, an indication whether one or more doors of the vehicle 150 have been opened or closed. The status information may be used by the processor 255 to generate a control signal for activating one or more door lock actuators 280. The door lock actuators 280 may be activated in order to secure the contents of the vehicle 150 when the driver of the vehicle 150 has bailed out through an open door.

The input/output interface 260 may receive from the brake pedal sensor 215 an indication whether the brake pedal has been depressed and/or a signal indicating an extent of depression of the brake pedal. The input/output interface 260 may also receive from the accelerator sensor 220 an indication whether the accelerator has been depressed and/or signals indicating an indication of the extent of depression of the accelerator. The input/output interface 260 may also receive from the gear box sensor 225 a signal about a gear that has been engaged at any instant in time when the vehicle 150 is in motion. For, example, the signal may indicate that a low gear is being used over a first period time and a high gear is being used during a second period of time. The signal received from the gear box sensor 225 may be used by the processor 255 individually or in combination with signals received from the brake pedal sensor 215 and/or the accelerator sensor 220 to determine whether the vehicle 150 has been placed in a pursuit mode of operation.

The input/output interface 260 may receive from the tachometer 226 data about the speed of the vehicle 150. For, example, the data provided by the tachometer 226 can be passed on to the processor 255 by the input/output interface 260. The processor 255 may use the data to analyze speeding characteristics of the vehicle 150 for determining whether the vehicle 150 has been placed in a pursuit mode of operation.

The input/output interface 260 may receive from the trunk latch sensor 230 an indication whether the trunk of the vehicle 150 is locked or unlocked. The indication may be used by the processor 255 to generate a control signal for activating a trunk latch actuator 285 for locking the trunk of the vehicle 150 in order to secure the contents of the trunk when the driver has bailed out.

The input/output interface 260 may receive from the gun vault sensor 235 an indication whether a gun vault in the vehicle 150 is locked or unlocked. The indication may be used by the processor 255 to generate a control signal for activating a gun vault lock actuator 290 for locking the gun vault in order to secure armaments stored in the gun vault.

The input/output interface 260 may receive from the ignition key sensor 240 an indication whether a car key has been left in a starter mechanism. This information may be used by the processor 255 to carry out various operations upon components of the vehicle 150 in order to secure the vehicle 150 after the driver has bailed out.

The input/output interface 260 may receive an indication that one or more warning lights have been activated and/or a siren has been activated in the vehicle 150 which may be a police vehicle or an ambulance for example that is responding to an emergency. The processor 255 may determine the vehicle 150 has been placed in a pursuit mode of operation or of an impending bailout operation, based on the indication that the warning lights have been activated and/or the siren has been activated.

The input/output interface 260 may receive an indication that one or more seat belt buckles have been unbuckled, and/or an indication from a seat occupancy sensor that an occupant has got up from a seat. The processor 255 may use such indications to determine a bailout operation or to secure the vehicle 150 after the driver has bailed out.

The input/output interface 260 may receive from an audio transducer 245, audio segments pertaining to some or all parts of a conversation between the driver of the vehicle 150 and an operator located outside the vehicle 150. The conversation may be carried out over a communications apparatus 253 such as a radio communications device. In an exemplary scenario, the driver of the vehicle 150 is a police officer and the operator may be a police radio dispatcher or a police supervisor providing instructions and/or orders to the police officer. In another exemplary scenario, the driver of the vehicle 150 is an emergency response technician and the operator may be a supervisor, a 911 operator, or a victim, providing information to the emergency response technician.

The conversation may include certain cue words such as "pursuit," "emergency," "fire," and "911" that may be uttered by the driver and/or by the operator. Such words, which may be indicative of a police pursuit or an emergency response, can be detected by the processor 255 and used to identify various events such as a high-speed police pursuit or an impending bailout from the vehicle 150. The processor 255 may generate various types of signals in response to detecting such events. For example, the processor 255 may generate a control signal that may be transmitted to the gun vault lock actuator 290 for activating a latch in a gun vault located in the vehicle 150. the gun vault may be latched in order to secure armaments stored in the gun vault when the driver of the vehicle 150 (a police officer, for example) has bailed out. As another example, the processor 255 may generate a control signal that may be transmitted to the ignition key lock-out actuator 295 for disabling an ignition system of the vehicle 150 in order to secure the vehicle 150 (a fire truck, for example) when the driver has bailed out.

In an exemplary embodiment, the vehicle bailout system computer 250 may be communicatively coupled to a server 275 via a network 270. The network 270 may include any one or a combination of various networks such as a local area network (LAN), a wide area network (WAN), a telephone network, a cellular network, a cable network, a wireless network, and/or private/public networks such as the Internet. The server 275, which may include one or more computers, may be used to provide various types of instructions to the vehicle bailout system computer 250. The vehicle bailout system computer 250 may carry out these instructions by issuing various types of signals such as for operating the door lock actuators 280, the trunk latch actuator 285, the gun vault actuator 290, and/or the ignition key lock-out actuator 295. The server 275 may thus be used from a remote location to execute various operations associated with detecting an impending bailout and/or for securing various items in the vehicle after a bailout in accordance with the disclosure.

The vehicle bailout system computer 250 may also be communicatively coupled to one or more telematic devices such as a telematic device 251 located in the vehicle 150. Some examples of the telematic device 251 can include an infotainment system mounted on a dashboard of the vehicle 150, a radio communications device mounted in the vehicle 150, a personal device such as a smartphone carried by the driver or another occupant of the vehicle 150, a computer installed in the vehicle 150, and a portable computing device such as a tablet computer. The telematic device 251 may be used to inform the vehicle bailout system computer 250 and/or to assist in detection by the vehicle bailout system computer 250 of an impending bailout and/or for securing various items in the vehicle after a bailout in accordance with the disclosure. In an example implementation, the vehicle bailout system computer 250 may use voice recognition techniques to identify cue words uttered by the driver or included in a conversation between the driver and a person outside the vehicle 150 over the radio communications apparatus 253.

The vehicle bailout system computer 250 may also be communicatively coupled to a switch 252 that may be mounted on the dashboard of the vehicle 150 for example. The driver of the vehicle 150 may actuate the switch 252 to inform the vehicle bailout system computer 250 that the vehicle 150 is involved in a high-speed pursuit and/or to inform the vehicle bailout system computer 250 that the driver is bailing out of the vehicle 150. The vehicle bailout system computer 250 may determine an impending bailout of the vehicle 150 based on the actuation of the switch. The actuation of the switch may also be used by the vehicle bailout system computer 250 to secure various items in the vehicle 150 after the driver has bailed out.

It must be understood that a memory device such as the memory 265 can include anyone or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
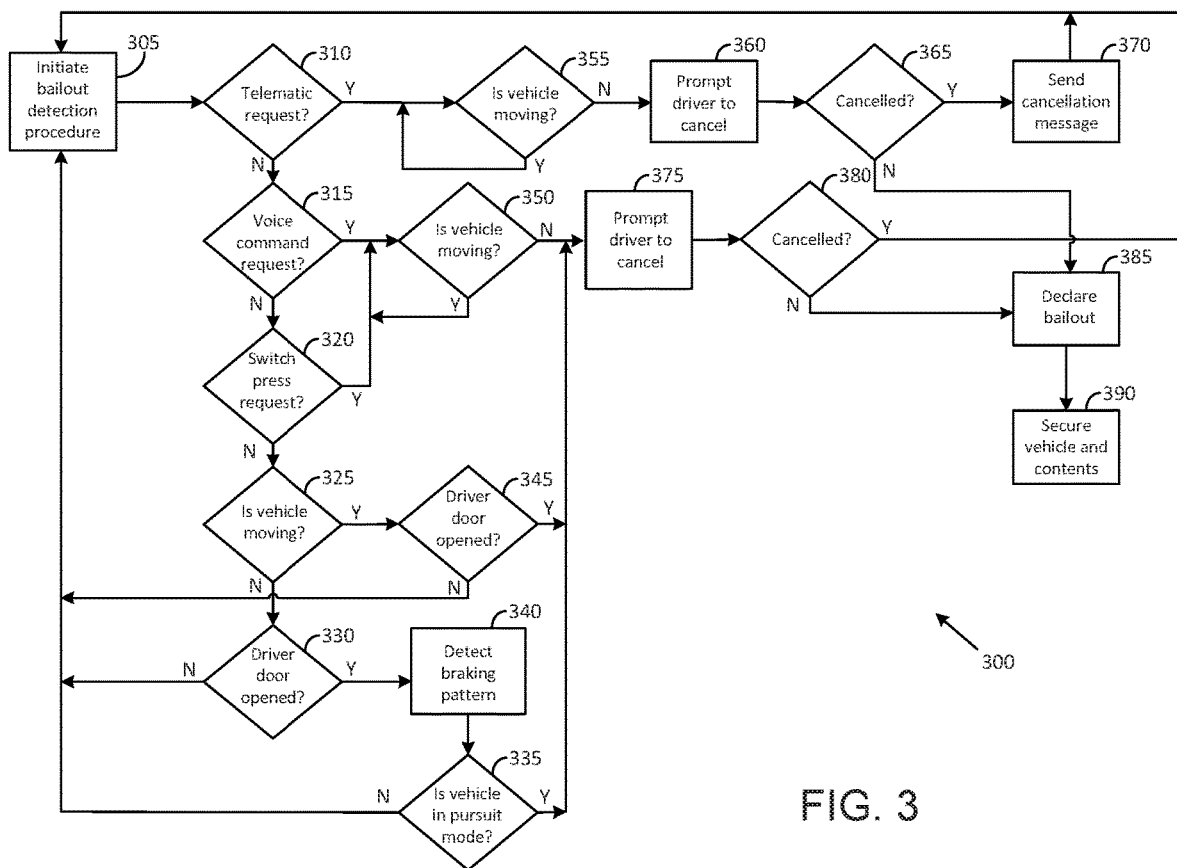
FIG. 3 shows a first exemplary flowchart of a method to detect an impending bailout from a vehicle in accordance with the disclosure.

FIG. 3 shows an exemplary flowchart 300 of a method to detect an impending bailout from a vehicle in accordance with the disclosure. The exemplary flowchart 300, and each of other flowcharts described herein, illustrates a sequence of operations that can be implemented in hardware, software, or a combination thereof. In the context of software, the operations represent computer-executable instructions stored on one or more non-transitory computer-readable media such as the memory 265, that, when executed by one or more processors such as the processor 255, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the exemplary flowchart 300 may be carried out by using an application stored in the memory 265 and executed by the processor 255 of the vehicle bailout system computer 250.

The system 200 will be used for purposes of describing some of the operations included in the flowchart 300. However, it must be understood that the flowchart 300 is equally applicable to many other systems in accordance with the disclosure. At block 305, a bailout detection procedure is initiated. The bailout detection procedure may be initiated for example, by the processor 255 fetching computer-executable instructions provided in a code module such as the bailout detection system 266 in the memory 265 and executing the computer-executable instructions.

At block 310, a determination is made whether a telematic request has been received by the vehicle bailout system computer 250 (from the telematic device 251 for example). If no telematic request has been received by the vehicle bailout system computer 250, at block 315, a determination is made whether a voice command request has been received by the vehicle bailout system computer 250 (via the audio transducer 245 or the telematic device 251 for example).

If no voice command request has been received by the vehicle bailout system computer 250, at block 320, a determination is made whether a switch press request has been received by the vehicle bailout system computer 250 (from the switch 252 for example). If no switch press request has been received by the vehicle bailout system computer 250, at block 325, a determination is made whether the vehicle 150 is moving. The vehicle bailout system computer 250 may make this determination by obtaining information from the engine controller 112 in the automotive computer 110 and/or from one or more sensors such as the ignition key sensor 240 (engine has been turned off) and the gear box sensor 225 (gear box in "park" or "neutral" position). If the vehicle 150 is not moving, at block 330 a determination is made whether a driver door has been opened. The vehicle bailout system computer 250 may make this determination by obtaining information from the door open/close sensors 210. If the driver door is not open, operations indicated by block 305 are carried out followed by subsequent operations.

At block 310, if a telematic request has been received by the vehicle bailout system computer 250, at block 355, a determination is made whether the vehicle 150 is moving. The vehicle bailout system computer 250 may make this determination by obtaining information from the engine controller 112 in the automotive computer 110 and/or from one or more sensors such as the ignition key sensor 240 (engine has been turned off) and the gear box sensor 225 (gear box in "park" or "neutral" position). If the vehicle 150 is moving, the movement of the vehicle 150 is monitored in a continuous manner until the vehicle 150 has stopped. When the vehicle 150 is no longer moving, at block 360, the vehicle bailout system computer 250 may issue a prompt to the driver of the vehicle 150 to cancel the telematic request. The prompt may be transmitted to the telematic device 251 that has originated the telematic request (block 310).

At block 365, a determination is made whether the telematic request has been canceled. If the telematic request has been canceled, at block 370, a message may be sent to the telematic device 251 indicating cancellation of the telematic request and flowchart operations are resumed from block 305. If the telematic request has not been canceled, at block 385, a bailout situation is declared by the vehicle bailout system computer 250. In one exemplary implementation, a message may be transmitted by the vehicle bailout system computer 250 to the server 275, for example to inform an operator or supervisor of the bailout. At block 390, various actions may be taken to secure the vehicle 150 and the contents of the vehicle 150 after the bailout.

Drawing attention back to block 315, if a voice command request has been received, the various operations indicated by block 350, block 375, block 380, block 385, and block 390 may be executed. The operations indicated by block 350, block 375, block 380 are similar to the operations described above with respect to block 355, block 360, and block 365.

At block 325, if the determination is made that the vehicle 150 is moving, at block 345, a determination is made whether the driver door has been opened. The vehicle bailout system computer 250 may make this determination by obtaining information from the door open/close sensors 210. If the driver door is not open, operations indicated by block 305 are carried out followed by subsequent operations. If the driver door is open, the various operations indicated by block 375, block 380, block 385, and block 390 may be executed.

At block 330, if the driver door is open, at block 340, a braking pattern of the vehicle 150 is detected. The detection of the braking pattern may be carried out by the vehicle bailout system computer 250 obtaining information from the brake pedal sensor 215. the information may be used to determine if the vehicle 150 was stopped within a preset period of time. At block 335, a determination is made whether the vehicle 150 is operating in a pursuit mode of operation. The vehicle bailout system computer 250 may determine that the vehicle 150 is in the pursuit mode of operation based on the vehicle 150 having been stopped within the preset period of time (indicative of an abrupt stop) and/or by obtaining information from the engine controller 112. If the vehicle 150 is not in a pursuit mode of operation, operations indicated by block 305 is carried out followed by subsequent operations as shown in the flowchart 300. If the vehicle 150 is in a pursuit mode of operation, operations indicated by block 375 is carried out followed by subsequent operations as shown in the flowchart 300.

Figure 4:
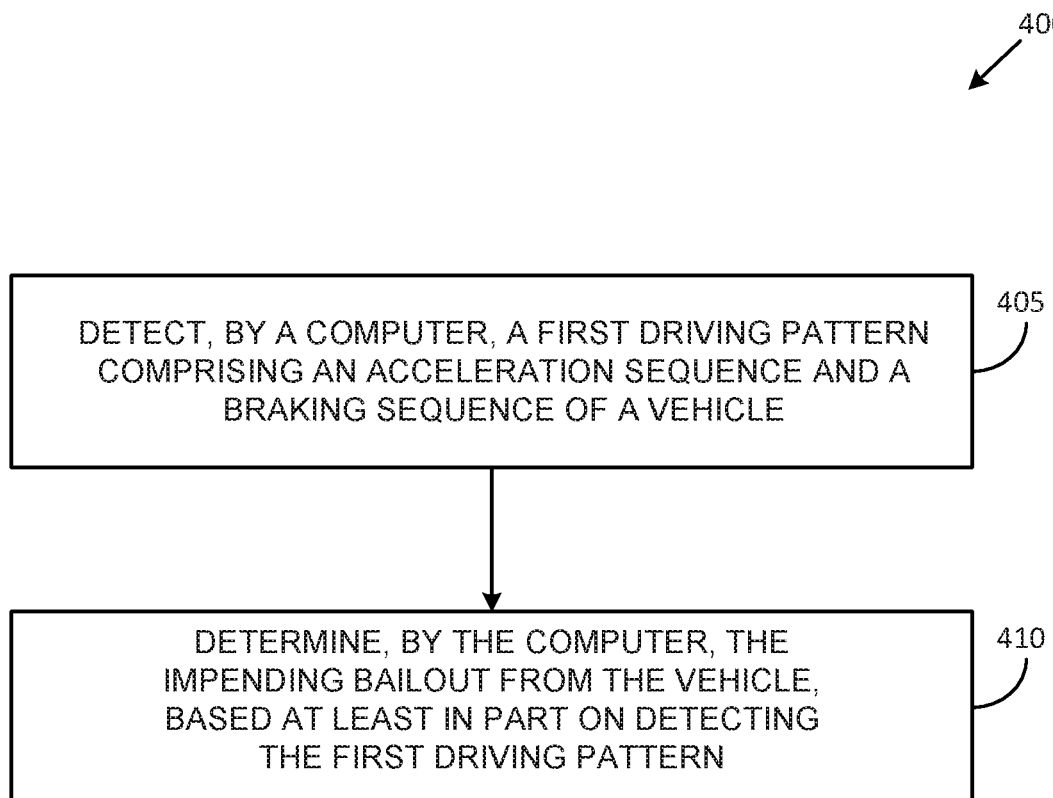
FIG. 4 shows a second exemplary flowchart of a method to detect an impending bailout from a vehicle in accordance with the disclosure.

FIG. 4 shows an exemplary flowchart 400 of a method to detect an impending bailout from a vehicle in accordance with the disclosure. The system 200 will be used for purposes of describing some of the operations included in the flowchart 400. However, it must be understood that the flowchart 400 is equally applicable to many other systems in accordance with the disclosure. The impending bailout detection may be carried out for example, by the processor 255 fetching computer-executable instructions provided in a code module such as the bailout detection system 266 in the memory 265 followed by execution of the computer-executable instructions.

At block 405, a computer such as the vehicle bailout system computer 250 detects a first driving pattern that may include an acceleration sequence and a braking sequence. In one exemplary scenario, detecting the first driving pattern may be carried out by the vehicle bailout system computer 250 receiving from various sensors such as the brake pedal sensor 215, the accelerator sensor 220 and the gear box sensor 225 information that is indicative of the vehicle 150 having been placed in a pursuit mode of operation. For example, the brake pedal sensor 215 may provide information to the processor 255 that the driver of the vehicle 150 has carried out a hard braking action on the vehicle 150. The gear box sensor 225 may indicate that downshifting has occurred within a preset amount of time. The preset amount of time may be set by the processor 255 in accordance with a threshold braking time that indicates that the vehicle 150 is being, or has been, placed in a pursuit mode of operation. Furthermore, the gear box sensor 225 may indicate that a gear in use during a downshifted mode of operation is not the lowest gear in the vehicle 150. Operating at a gear that is higher than the lowest gear may allow the gear mechanism to shift into a higher gear rapidly so as to resume acceleration with minimal delay.

The accelerator sensor 220 may further provide information to the processor 255 that the driver of the vehicle 150 is rapidly accelerating the vehicle 150. The gear box sensor 225 may indicate that gear upshifting has occurred within a preset amount of time. The preset amount of time may be set by the processor 255 in accordance with a threshold acceleration time that indicates that the vehicle 150 is being, or has been, placed in a pursuit mode of operation. Furthermore, the gear box sensor 225 may indicate that that a gear in use during an upshifted mode of operation is the highest gear in the vehicle 150. Operating at a high gear allows the vehicle 150 to accelerate rapidly and travel at high speed in a pursuit mode of operation. The gear box sensor 225 may also provide information that a transition time from the gear in which the vehicle 150 was operating during the braking procedure to the gear in which the vehicle 150 is accelerating is within a preset amount of time. The preset amount of time may be set by the processor 255 in accordance with a threshold acceleration time that indicates that the vehicle 150 is being, or has been, placed in a pursuit mode of operation.

In another exemplary scenario, detecting the first driving pattern may be carried out by the vehicle bailout system computer 250 receiving information from the automotive computer 110. The information provided by the automotive computer 110, which can include air-fuel mixture information and/or rate of flow of the air-fuel mixture into the engine 120, can be analyzed by the processor 255 to determine that the vehicle 150 is being, or has been, placed in a pursuit mode of operation.

In another exemplary scenario, detecting the first driving pattern may be carried out by the vehicle bailout system computer 250 receiving information from the tachometer 226. The information provided by the tachometer 226 can include speeding characteristics of the vehicle 150 indicative of a pursuit mode of operation of the vehicle 150.

In yet another exemplary scenario, detecting the first driving pattern may be carried out by the vehicle bailout system computer 250 receiving information from the audio transducer 245. The information provided by the audio transducer 245 may include one or more cue words that indicate that the vehicle 150 will be placed in a pursuit mode of operation or has been placed in a pursuit mode of operation. For example, the cue words may be uttered by a police officer who is the driver of the vehicle 150 into a radio communications device to inform a police supervisor that the police officer intends to, or is in the process of, pursuing a law breaker who is driving another vehicle.

At block 410, the computer determines an impending bailout by the driver of the vehicle 150 based at least in part on detecting the first driving pattern. The impending bailout may also be detected on the basis of other actions such as activation of a siren and/or a flashing light mounted on the vehicle 150, various positions of a steering wheel, a deceleration characteristic of the vehicle 150, and a door of the vehicle 150 being opened. The various positions of the steering wheel may be monitored over certain periods of time so that the computer can determine if the steering wheel has been rapidly and sharply turned in various directions (as would be expected during a police pursuit, for example). The deceleration characteristic of the vehicle 150 may be monitored by the computer to determine if the vehicle 150 has been stopped quickly over a short distance (as would be expected during a police pursuit, for example). A very short duration of time spent in opening a door of the vehicle 150 may also indicate to the computer that the driver has opened the door of the vehicle 150 in a hurry and bailed out.

Various parameters such as time durations and amplitudes that may be associated with detecting these actions, may be detected by using preset time windows. For example, an opening of a door of the vehicle 150 within a time window of a few seconds would indicate an impending bailout to the vehicle bailout system computer 250. As another example, a change in position in the steering wheel over 45 degrees back and forth within a time window of a few minutes may also indicate an impending bailout to the vehicle bailout system computer 250.

Figure 5:
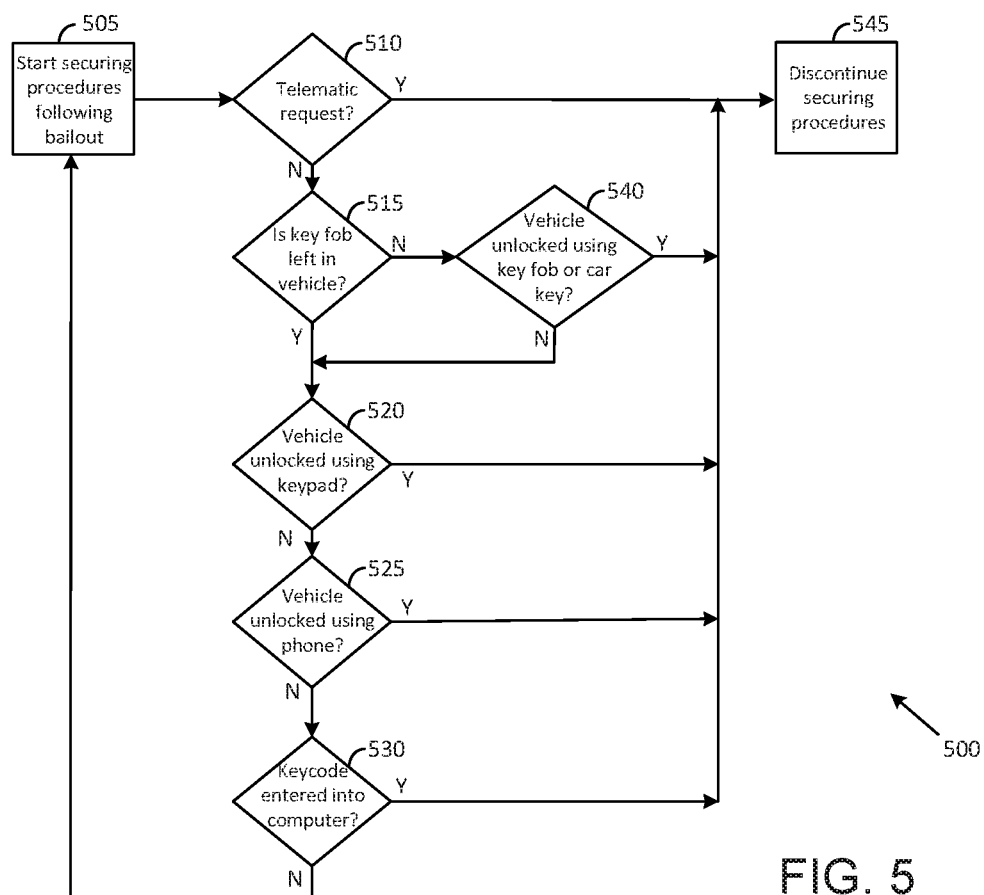
FIG. 5 shows a first exemplary flowchart of a method to secure a vehicle and the contents of the vehicle after a bailout, in accordance with the disclosure.

FIG. 5 shows an exemplary flowchart 500 of a method to secure a vehicle and the contents of the vehicle after a bailout, in accordance with the disclosure. The system 200 will be used for purposes of describing some of the operations included in the flowchart 500. However, it must be understood that the flowchart 500 is equally applicable to many other systems in according to the disclosure. The flowchart 500 indicates some exemplary operations that may be executed in accordance with block 390 shown in the flowchart 300.

At block 505, a computer such as the vehicle bailout system computer 250 initiates securing operations for securing the vehicle 150 and/or the contents of the vehicle 150 after the bailout. Some exemplary securing operations are described below with reference to another figure. The securing operations may be initiated for example, by the processor 255 fetching computer-executable instructions provided in a code module such as the securing system 267 in the memory 265 and executing the computer-executable instructions.

At block 510, a determination is made whether a telematic request has been received by the vehicle bailout system computer 250 (from the telematic device 251 for example). The telematic request may have led to operations that led to the bailout from the vehicle 150. If no telematic request has been received by the vehicle bailout system computer 250, at block 515, a determination is made whether a key fob has been left in the vehicle 150. The key fob may have been left in the vehicle by the driver of the vehicle 150 (a police officer or emergency response personnel, for example) after bailing out of the vehicle 150 in a hurry. Consequently, the key fob may be unavailable for use by the driver to re-enter the vehicle 150. If the key fob has not been left in the vehicle, at block 540, a determination is made whether the vehicle 150 has been unlocked by using the key fob (or by using a car key inserted into the ignition start mechanism of the vehicle 150). Use of either the key fob or the car key would indicate that the driver has re-entered the vehicle 150 in a permissible manner. If the key fob or the car key has been used, at block 545, some or all of the securing operations may be discontinued.

However, if neither the key fob nor the car key has been used to unlock the vehicle 150, any attempt to unlock the car would indicate an impermissible attempt to break into the vehicle 150. The impermissible attempt may be carried out, for example, by a perpetrator attempting to steal the vehicle 150 for fleeing a scene of a crime. Consequently, if neither the key fob or the car key has been used to unlock the vehicle 150, at block 520, a determination is made whether the vehicle 150 has been unlocked using a keypad provided in a door of the vehicle 150 for example. If the keypad has been used for unlocking the vehicle 150, at block 545, the securing operations may be discontinued.

If the vehicle 150 has not been unlocked by using a keypad, at block 525, a determination is made whether the vehicle 150 has been unlocked by using a phone. For example, the driver of the vehicle 150 may have a software application in a smartphone that can be used to lock or unlock the car. If a phone has been used for unlocking the vehicle 150, at block 545, the securing operations may be discontinued.

If a phone has not been used for unlocking the vehicle 150, at block 530, a determination is made whether a valid keycode has been entered into the vehicle bailout system computer 250. For example, the driver of the vehicle 150 may enter the keycode through a touch panel of the vehicle bailout system computer 250 after re-entering the vehicle 150. If a valid keycode has been entered into the touch pad, at block 545, the securing operations may be discontinued. If a valid keycode has not been entered into the touch pad, at block 505, securing operations for securing the vehicle 150 and/or the contents of the vehicle 150 after the bailout is persisted. The securing operations may persist if a perpetrator enters an invalid keycode in an attempt to break into the vehicle bailout system computer 250 for disabling one or more securing operations carried out by the vehicle bailout system computer 250.

Figure 6:
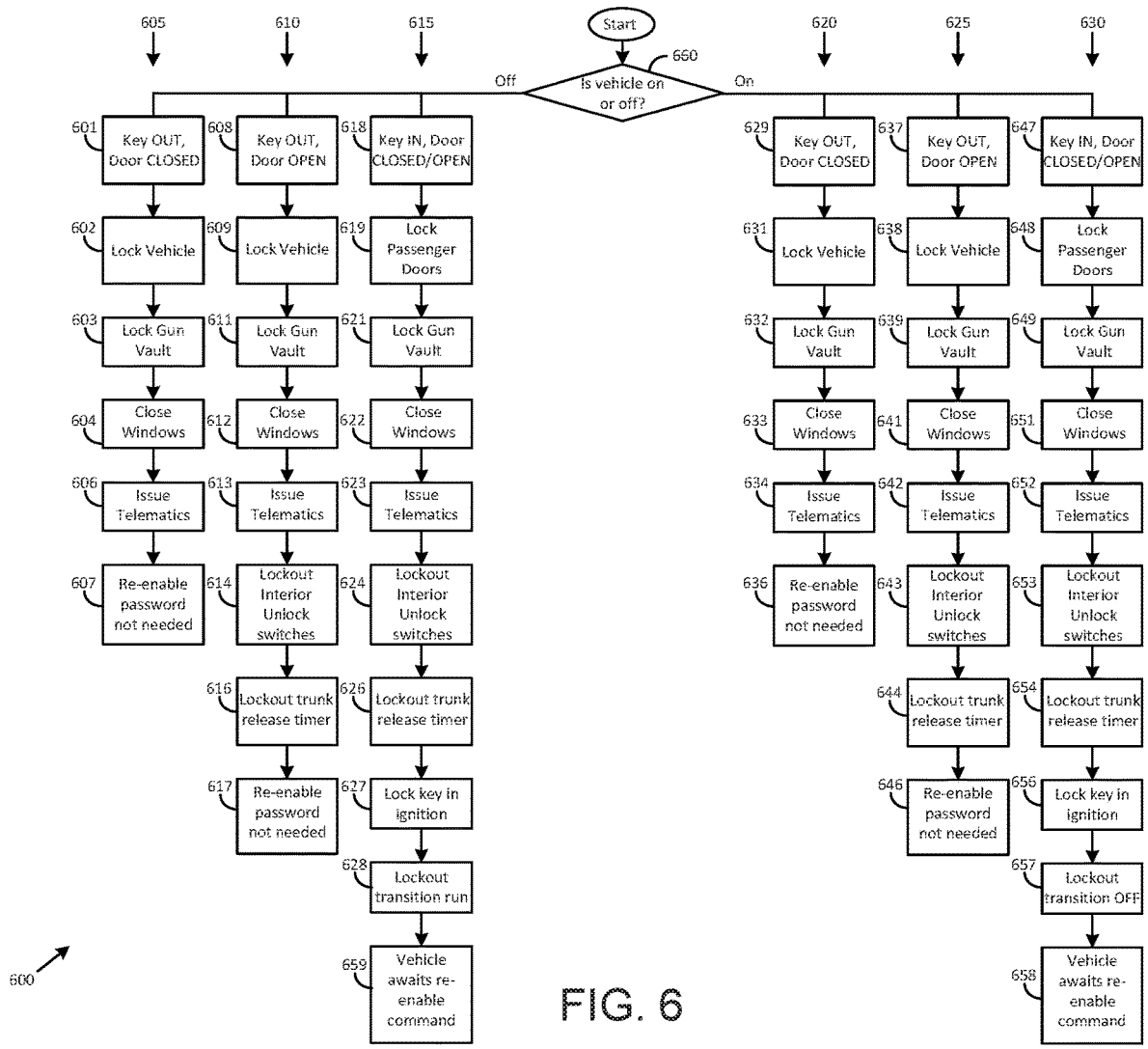
FIG. 6 shows a second exemplary flowchart of a method to secure a vehicle and the contents of the vehicle after a bailout, in accordance with the disclosure.

FIG. 6 shows an exemplary flowchart 600 of a method to secure a vehicle and the contents of the vehicle after a bailout, in accordance with the disclosure. The system 200 will be used for purposes of describing some of the operations included in the flowchart 600. However, it must be understood that the flowchart 600 is equally applicable to many other systems in according to the disclosure. The flowchart 600 indicates some exemplary operations that may be executed in accordance with block 390 shown in the flowchart 300.

At block 660, a determination is made whether the vehicle 150 is in an on condition or an off condition. At least three different exemplary scenarios may exist if the vehicle 150 is in an off condition. In a first scenario 605, at block 601, the car key of the vehicle 150 may have been taken out of the vehicle 150 by the driver and the door of the vehicle 150 closed. For example, a police officer driving the vehicle 150 may have stopped the vehicle 150, turned off the engine, and exited the vehicle 150 with the car keys (or key fob) in his/her pocket. The vehicle bailout system computer 250 may receive information from the various sensors and determine that the police officer has bailed out of the vehicle 150. At block 602, the vehicle bailout system computer 250 may transmit one or more signals to the door lock actuators 280 for locking one or more doors of the vehicle 150. At block 603 the vehicle bailout system computer 250 may transmit a signal to the gun vault lock actuator 290 to lock a gun vault located in the vehicle 150. At block 604, the vehicle bailout system computer 250 may transmit one or more signals to one or more actuators to close one or more windows of the vehicle 150. At block 606, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 that the vehicle 150 and a gun vault in the vehicle 150 has been secured. At block 607, the vehicle bailout system computer 250 determines that a password may not be needed by the driver of the vehicle 150 to re-enter the vehicle 150 and/or to unlock other components in the vehicle 150 such as the gun vault.

In a second scenario 610, at block 608, the car key of the vehicle 150 may have been taken out of the vehicle 150 by the driver and the door of the vehicle 150 opened. For example, a police officer driving the vehicle 150 may have stopped the vehicle, turned off the engine, and exited the vehicle with the car keys (or key fob) in his/her pocket. However, the police officer may not have had time to lock the doors of the vehicle 150. The vehicle bailout system computer 250 may receive information from the various sensors and determine that the police officer has bailed out of the vehicle 150 but has left one or more doors of the vehicle 150 unlocked. At block 609, the vehicle bailout system computer 250 may transmit one or more signals to the door lock actuators 280 for locking one or more doors of the vehicle 150. At block 611, the vehicle bailout system computer 250 may transmit a signal to the gun vault lock actuator 290 to lock a gun vault located in the vehicle 150. At block 612, the vehicle bailout system computer 250 may transmit one or more signals to one or more actuators to close one or more windows of the vehicle 150. At block 613, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 that the vehicle 150 and the gun vault has been secured. At block 614, the vehicle bailout system computer 250 may transmit one or more signals to one or more actuators to disable some components inside the vehicle 150. For example, the vehicle bailout system computer 250 may transmit one or more signals to disable all door unlock components to prevent an occupant of the vehicle 150 (a prisoner, for example) from unlocking the doors and escaping from the vehicle 150.

At block 616, the vehicle bailout system computer 250 may transmit one or more signals to one or more actuators to disable some parts of the vehicle 150. For example, the vehicle bailout system computer 250 may transmit one or more signals to disable a trunk release mechanism in the vehicle 150 for securing the contents in the trunk of the vehicle 150. At block 617, the vehicle bailout system computer 250 determines that a password may not be needed by the driver of the vehicle 150 to re-enter the vehicle 150 and/or to unlock other components in the vehicle 150 such as the gun vault.

In a third scenario 615, at block 618, the car key of the vehicle 150 may been left in the vehicle 150 after the driver of the vehicle 150 has bailed out. The door of the vehicle 150 may have been either locked or left unlocked in this third scenario. The vehicle bailout system computer 250 may receive information from the various sensors and determine that the police officer has bailed out of the vehicle 150. At block 619, the vehicle bailout system computer 250 may transmit one or more signals to the door lock actuators 280 for locking one or more passenger doors of the vehicle 150. At block 621, the vehicle bailout system computer 250 may transmit a signal to the gun vault lock actuator 290 to lock a gun vault located in the vehicle 150. At block 622, the vehicle bailout system computer 250 may transmit one or more signals to one or more actuators to close one or more windows of the vehicle 150. At block 623, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 that the vehicle 150 and the gun vault has been secured. At block 624, the vehicle bailout system computer 250 may transmit one or more signals to one or more actuators to disable some components inside the vehicle 150. For example, the vehicle bailout system computer 250 may transmit one or more signals to disable all door unlock components to prevent an occupant of the vehicle 150 (a prisoner, for example) from unlocking the doors and escaping from the vehicle 150.

At block 626, the vehicle bailout system computer 250 may transmit one or more signals to one or more actuators to disable some parts of the vehicle 150. For example, the vehicle bailout system computer 250 may transmit one or more signals to disable a trunk release mechanism in the vehicle 150 for securing the contents in the trunk of the vehicle 150. At block 627, the vehicle bailout system computer 250 may transmit a signal to the ignition key lock-out actuator 295 to disable operation of the ignition mechanism thereby rendering the car key of the vehicle 150 inoperable. Doing so may prevent a miscreant who has entered the vehicle 150 from stealing the vehicle 150.

At block 628, the vehicle bailout system computer 250 may transmit a signal to one or more other components and/or mechanisms in the vehicle 150 so as to disable some operations. For example, the vehicle bailout system computer 250 may transmit a signal to a gear box mechanism that disables operation of a gear shift in the vehicle 150. Doing so may prevent a miscreant who has entered the vehicle 150 and hot-wired the ignition system from driving away in the vehicle 150. As another example, the vehicle bailout system computer 250 may execute a log out operation that disables the use of the vehicle bailout system computer 250. As yet another example, the vehicle bailout system computer 250 may transmit a signal to a key fob that may be attached to the car key that has been left in the vehicle 150 after the driver has bailed out and/or to the ignition lock so as to prevent the car key from being removed by someone other than the driver.

At block 659, the vehicle bailout system computer 250 waits for a password to enable various functions of the vehicle 150. For example, the vehicle bailout system computer 250 may wait for the driver to enter a password on a keypad coupled to the vehicle bailout system computer 250 for allowing the driver to use the vehicle bailout system computer 250. As another example, the vehicle bailout system computer 250 may wait for the driver to enter a password for enabling the ignition mechanism and the gear box mechanism for moving the vehicle 150.

Drawing attention back to block 660, a determination is made whether the vehicle 150 is in an on condition or an off condition. There may be at least three different exemplary scenarios if the vehicle 150 is in an on condition. In a first scenario 620, at block 629, the car key of the vehicle 150 may been taken out of the vehicle 150 and the door of the vehicle 150 closed. For example, a police officer driving the vehicle 150 may have left the engine running and exited the vehicle 150 with the car keys (or key fob) in his/her pocket. The vehicle bailout system computer 250 may receive information from the various sensors and determine that the police officer has bailed out of the vehicle 150 and the doors of the vehicle 150 are closed. At block 631, the vehicle bailout system computer 250 may transmit one or more signals to the door lock actuators 280 for locking the doors of the vehicle 150.

At block 632, the vehicle bailout system computer 250 may transmit a signal to the gun vault lock actuator 290 to lock a gun vault located in the vehicle 150. At block 633, the vehicle bailout system computer 250 may transmit one or more signals to one or more actuators to close one or more windows of the vehicle 150. At block 634, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 and gun vault being secured. At block 636, the vehicle bailout system computer 250 determines that a password may not be needed by the driver of the vehicle 150 to re-enter the vehicle 150 and/or to unlock other components in the vehicle 150 such as the gun vault.

In a second scenario 625, at block 637, the car key of the vehicle 150 may have been taken out of the vehicle 150 and the door of the vehicle 150 left open. For example, a police officer driving the vehicle 150 may have left the engine running and exited the vehicle 150 in a hurry with the car keys (or key fob) in his/her pocket leaving the door of the vehicle 150 open. The vehicle bailout system computer 250 may receive information from the various sensors and determine that the police officer has bailed out of the vehicle 150. At block 638, the vehicle bailout system computer 250 may transmit one or more signals to the door lock actuators 280 for locking one or more doors of the vehicle 150.

At block 639, the vehicle bailout system computer 250 may transmit a signal to the gun vault lock actuator 290 to lock a gun vault located in the vehicle 150. At block 641, the vehicle bailout system computer 250 may transmit one or more signals to one or more actuators to close one or more windows of the vehicle 150. At block 642, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 that the vehicle 150 and the gun vault has been secured. At block 643, the vehicle bailout system computer 250 may transmit one or more signals to one or more actuators to disable some components inside the vehicle 150. For example, the vehicle bailout system computer 250 may transmit one or more signals to disable all door unlock components to prevent an occupant of the vehicle 150 (a prisoner, for example) from unlocking the doors and escaping from the vehicle 150.

At block 644, the vehicle bailout system computer 250 may transmit one or more signals to one or more actuators to disable some parts of the vehicle 150. For example, the vehicle bailout system computer 250 may transmit one or more signals to disable a trunk release mechanism in the vehicle 150 for securing the contents in the trunk of the vehicle 150. At block 646, the vehicle bailout system computer 250 determines that a password may not be needed by the driver of the vehicle 150 to re-enter the vehicle 150 and/or to unlock other components in the vehicle 150 such as the gun vault.

In a third scenario 630, at block 647, the car key of the vehicle 150 may been left in the vehicle 150 after the driver of the vehicle 150 has bailed out. The door of the vehicle 150 may have been either locked or left unlocked by the driver in this third scenario 630. The vehicle bailout system computer 250 may receive information from the various sensors and determine that the police officer has bailed out of the vehicle 150. At block 648, the vehicle bailout system computer 250 may transmit one or more signals to the door lock actuators 280 for locking one or more passenger doors of the vehicle 150. At block 649, the vehicle bailout system computer 250 may transmit a signal to the gun vault lock actuator 290 to lock a gun vault located in the vehicle 150. At block 651, the vehicle bailout system computer 250 may transmit one or more signals to one or more actuators to close one or more windows of the vehicle 150. At block 652, the vehicle bailout system computer 250 may transmit a message to the telematic device 251. For example, the vehicle bailout system computer 250 may transmit an audible message to a smartphone carried by the driver of the vehicle 150 to inform the driver of the vehicle 150 that the vehicle 150 and the gun vault has been secured. At block 653, the vehicle bailout system computer 250 may transmit one or more signals to one or more actuators to disable some components inside the vehicle 150. For example, the vehicle bailout system computer 250 may transmit one or more signals to disable all door unlock components to prevent an occupant of the vehicle 150 (a prisoner, for example) from unlocking the doors and escaping from the vehicle 150.

At block 654, the vehicle bailout system computer 250 may transmit one or more signals to one or more actuators to disable some parts of the vehicle 150. For example, the vehicle bailout system computer 250 may transmit one or more signals to disable a trunk release mechanism in the vehicle 150 for securing the contents in the trunk of the vehicle 150. At block 656, the vehicle bailout system computer 250 may transmit a signal to the ignition key lock-out actuator 295 to disable operation of the ignition mechanism thereby rendering the car key of the vehicle 150 inoperable. Doing so may prevent a miscreant who has entered the vehicle 150 from stealing the vehicle 150.

At block 657, the vehicle bailout system computer 250 may transmit a signal to one or more other components and/or mechanisms in the vehicle 150 so as to disable some operations. For example, the vehicle bailout system computer 250 may transmit a signal to a gear box mechanism that disables operation of a gear shift in the vehicle 150. Doing so may prevent a miscreant who has entered the vehicle 150 and hot-wired the ignition system from driving away in the vehicle 150. As another example, the vehicle bailout system computer 250 may execute a log out operation that disables the use of the vehicle bailout system computer 250. As yet another example, the vehicle bailout system computer 250 may transmit a signal to a key fob that may be attached to the car key that has been left in the vehicle 150 after the driver has bailed out and/or to the ignition lock so as to prevent the car key from being removed by someone other than the driver. The engine may be left running by the vehicle bailout system computer 250 so as to allow certain components of the vehicle 150 such as a radio communications device, a climate control system, and car lights to remain operable.

At block 658, the vehicle bailout system computer 250 waits for a password to enable various functions of the vehicle 150. For example, the vehicle bailout system computer 250 may wait for the driver to enter a password on a keypad coupled to the vehicle bailout system computer 250 for allowing the driver to use the vehicle bailout system computer 250. As another example, the vehicle bailout system computer 250 may wait for the driver to enter a password for enabling the ignition mechanism and the gear box mechanism for moving the vehicle 150.

Figure 7:
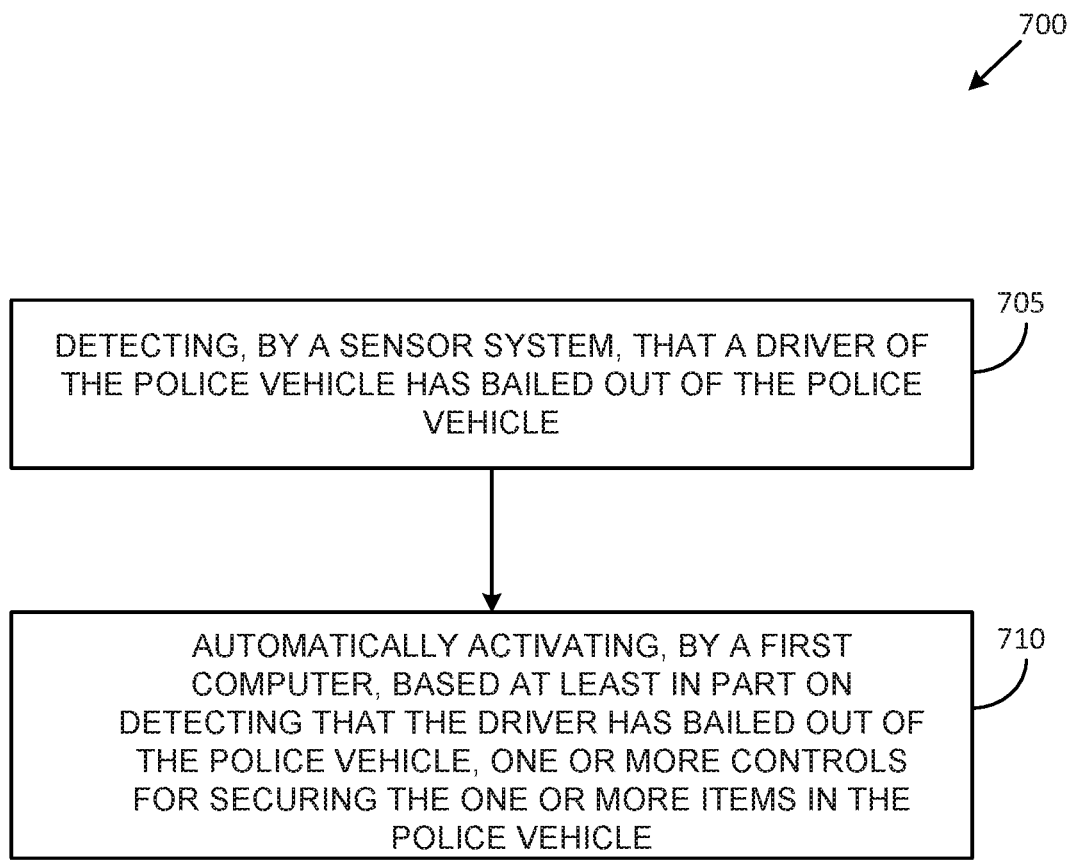
FIG. 7 shows a third exemplary flowchart of a method to secure a vehicle and the contents of the vehicle after a bailout, in accordance with the disclosure.

FIG. 7 shows an exemplary flowchart 700 of a method to secure a vehicle and the contents of the vehicle after a bailout, in accordance with the disclosure. The system 200 will be used for purposes of describing some of the operations included in the flowchart 700. However, it must be understood that the flowchart 700 is equally applicable to many other systems in according to the disclosure.

At block 705, a computer such as the vehicle bailout system computer 250, detects that a driver of the vehicle 150 has bailed out. This operation may be carried out by using at least some actions described above with reference to the flowchart 300 and the flowchart 500.

At block 710, the computer automatically activates one or more controls for securing the vehicle 150 and/or various items in the vehicle 150. This operation may be carried out by using the exemplary procedure described above with respect to the flowchart 600.

In the context of software, the operations described herein with respect to computers such as the vehicle bailout system computer 250 may be implemented by computer-executable instructions stored on one or more non-transitory computer-readable media such as the memory 265, that, when executed by one or more processors such as the processor 255, perform the recited operations. Generally, computer-executable instructions include routines, programs, objects, components, data structures, and the like that perform particular functions or implement particular abstract data types.

EXAMPLE EMBODIMENTS

In some instances, the following examples may be implemented together or separately by the systems and methods described herein.

Example 1 may include a method for securing a vehicle and/or one or more items in the vehicle after a bailout operation, the method comprising: determining, by a first computer, that a driver of the vehicle has bailed out of the vehicle; and automatically activating, by the first computer, based at least in part on determining that the driver has bailed out of the vehicle, one or more controls for securing at least one of the vehicle or one or more items in the vehicle.

Example 2 may include the method of example 1 and/or some other example herein, wherein the vehicle is a police vehicle, and wherein automatically activating, by the first computer, the one or more controls for securing the at least one of the vehicle or the one or more items in the vehicle comprises at least one of: locking a door of the police vehicle; logging out the first computer; locking a first component inside the police vehicle; and disabling an operation of at least a second component inside the police vehicle.

Example 3 may include the method of example 2 and/or some other example herein, wherein the first component is at least one of a gun vault or a glove compartment, and the second component is at least one of a door lock, a trunk release, an engine ignition switch, or a gear shifter.

Example 4 may include the method of example 1 and/or some other example herein, wherein the vehicle is a police vehicle, and wherein automatically activating, by the first computer, the one or more controls for securing the at least one of the vehicle or the one or more items in the vehicle is based in further part on detecting at least one of: a first driving pattern comprising an acceleration sequence and a braking sequence of the police vehicle; a gear shifting characteristic of the police vehicle during one of the acceleration sequence or the braking sequence; an activation of at least one of a siren or a flashing light mounted on the police vehicle; one or more cue words uttered by the driver; or that a door of the police vehicle has been opened within a first time period after the police vehicle has been stopped.

Example 5 may include the method of example 4 and/or some other example herein, wherein the one or more cue words are uttered by the driver into a communications apparatus that is operable to provide communications between the driver and an operator located outside the police vehicle.

Example 6 may include the method of example 4 and/or some other example herein, wherein the first computer is located in the police vehicle and wherein automatically activating, by the first computer, the one or more controls for securing the at least one of the vehicle or the one or more items in the vehicle is in response to one or more signals received from a second computer that is communicatively coupled to the first computer and is located outside the police vehicle.

Example 7 may include a method for securing a police vehicle and/or one or more items in the police vehicle after a bailout operation, the method comprising: detecting, by a sensor system, that the police vehicle has been placed in a pursuit mode of operation; and automatically activating, by a first computer, based at least in part on detecting the pursuit mode of operation, one or more controls for securing at least one of the police vehicle or one or more items in the police vehicle after the bailout operation.

Example 8 may include the method of example 7 and/or some other example herein, wherein the pursuit mode of operation involves a high-speed chase by the police vehicle.

Example 9 may include the method of example 7 and/or some other example herein, wherein the sensor system comprises one or more sensors configured to at least one of: detect a combination of an acceleration characteristic and a braking characteristic of the police vehicle that is indicative of the pursuit mode of operation; detect an activation of at least one of a siren or a flashing light mounted on the police vehicle; detect one or more cue words uttered by a driver of the police vehicle; or detect that a door of the police vehicle has been opened within a first time period after the police vehicle has been stopped.

Example 10 may include the method of example 9 and/or some other example herein, wherein the one or more cue words are uttered by the driver into a communications apparatus.

Example 11 may include the method of example 10 and/or some other example herein, wherein the communications apparatus is a radio system operable to provide communications between the driver and an operator located outside the police vehicle.

Example 12 may include the method of example 9 and/or some other example herein, wherein the first computer is a part of an engine controller provided in the police vehicle and wherein detecting that the police vehicle has been placed in the pursuit mode of operation is at least in part in response to one or more wireless signals transmitted to the engine controller by one of a telematic device in the police vehicle or a second computer that is communicatively coupled to the first computer and is located outside the police vehicle.

Example 13 may include the method of example 9 and/or some other example herein, wherein the first computer is a part of an engine controller provided in the police vehicle and wherein detecting that the police vehicle has been placed in the pursuit mode of operation is at least in part in response to signals received from one or more sensors of the sensor system.

Example 14 may include the method of example 13 and/or some other example herein, wherein the one or more sensors of the sensor system are coupled to one or more engine components of the police vehicle.

Example 15 may include a computer configured in part to secure a vehicle and/or one or more items in the vehicle after a bailout operation, the computer comprising: at least one memory that stores computer-executable instructions; and at least one processor configured to access the at least one memory and execute the computer-executable instructions to at least: receive, from a sensor system, one or more signals that indicate that the vehicle has been placed in a pursuit mode of operation; and automatically activate, based at least in part on the one or more signals received from the sensor system, one or more controls for securing at least one of the vehicle or one or more items in the vehicle after the bailout operation.

Example 16 may include the computer of example 15 and/or some other example herein, wherein the one or more signals are generated by the sensor system in response to detecting at least one of: a first driving pattern comprising an acceleration sequence and a braking sequence of the vehicle; a gear shifting characteristic of the vehicle during one of the acceleration sequence or the braking sequence; an activation of at least one of a siren or a flashing light mounted on the vehicle; one or more cue words uttered by a driver of the vehicle; or that a door of the vehicle has been opened within a first time period after the vehicle has been stopped.

Example 17 may include the computer of example 16 and/or some other example herein, wherein the computer is a part of an engine controller provided in the vehicle and wherein the one or more cue words are uttered by the driver into a communications apparatus that is communicatively coupled to the engine controller.

Example 18 may include the computer of example 16 and/or some other example herein, wherein the computer is a part of an engine controller provided in the vehicle and wherein the one or more cue words are uttered by the driver into a radio system operable to provide communications between the driver and an operator located outside the vehicle.

Example 19 may include the computer of example 16 and/or some other example herein, wherein the computer is a part of an engine controller provided in the vehicle and wherein the gear shifting characteristic of the vehicle is based on sensing one or more drive components of the vehicle.

Example 20 may include the computer of example 19 and/or some other example herein, wherein the vehicle is a police vehicle and wherein the one or more drive components comprises a gear shifter and an accelerator of the police vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Although certain aspects of various embodiments may have been described using a singular word or phrase (such as "a signal" or "a processor") it should be understood that the description may be equally applicable to plural words or phrases (such as "signals" and "processors").

That which is claimed is:

1. A method for securing a vehicle and/or one or more items in the vehicle after a bailout operation, the method comprising:
   determining that the vehicle is engaged in a pursuit mode;
   determining, by a first computer, that a driver of the vehicle has bailed out of the vehicle during the pursuit mode; and
   automatically activating, by the first computer, based at least in part on determining that the driver has bailed out of the vehicle and one or more cue words uttered by the driver, one or more controls for securing at least one of the vehicle or one or more items in the vehicle, wherein the one or more cue words are uttered by the driver into a communications apparatus that is operable to provide communications between the driver and an operator located outside the vehicle.

2. The method of claim 1, wherein the vehicle is a police vehicle, and wherein automatically activating, by the first computer, the one or more controls for securing the at least one of the vehicle or the one or more items in the vehicle comprises at least one of:
   locking a door of the police vehicle;
   logging out the first computer;
   locking a first component inside the police vehicle; and
   disabling an operation of at least a second component inside the police vehicle.

3. The method of claim 2, wherein the first component is at least one of a gun vault or a glove compartment, and the second component is at least one of a trunk release, an engine ignition switch, or a gear shifter.

4. The method of claim 1, wherein the vehicle is a police vehicle, and wherein automatically activating, by the first computer, the one or more controls for securing the at least one of the vehicle or the one or more items in the vehicle is based in further part on detecting at least one of:
- a first driving pattern comprising an acceleration sequence and a braking sequence of the police vehicle;
- a gear shifting characteristic of the police vehicle during one of the acceleration sequence or the braking sequence;
- an activation of at least one of a siren or a flashing light mounted on the police vehicle; or
- that a door of the police vehicle has been opened within a first time period after the police vehicle has been stopped.

5. The method of claim 4, wherein the first computer is located in the police vehicle and wherein automatically activating, by the first computer, the one or more controls for securing the at least one of the vehicle or the one or more items in the vehicle is in response to one or more signals received from a second computer that is communicatively coupled to the first computer and is located outside the police vehicle.

6. A system for securing a vehicle and/or one or more items in the vehicle after a bailout operation, the system comprising:
- a computer processor operable to execute a set of computer-executable instructions; and
- a memory operable to store the set of computer-executable instructions operable to:
  - determine that a driver of the vehicle has bailed out of the vehicle; and
  - automatically activate, based at least in part on determining that the driver has bailed out of the vehicle and based on one or more cue words uttered by the driver a, one or more controls for securing at least one of the vehicle or one or more items in the vehicle, wherein the one or more cue words are uttered by the driver into a communications apparatus that is operable to provide communications between the driver and an operator located outside the vehicle.

7. The system of claim 6, wherein the vehicle is a police vehicle, and wherein automatically activating the one or more controls for securing the at least one of the vehicle or the one or more items in the vehicle comprises at least one of:
- locking a door of the police vehicle;
- logging out of a computer within the vehicle;
- locking a first component inside the police vehicle; and
- disabling an operation of at least a second component inside the police vehicle.

8. The system of claim 7, wherein the first component is at least one of a gun vault or a glove compartment, and the second component is at least one of, a trunk release, an engine ignition switch, or a gear shifter.

9. The system of claim 6, wherein the vehicle is a police vehicle, and wherein automatically activating, the one or more controls for securing the at least one of the vehicle or the one or more items in the vehicle is based in further part on detecting at least one of:
- a first driving pattern comprising an acceleration sequence and a braking sequence of the police vehicle;
- a gear shifting characteristic of the police vehicle during one of the acceleration sequence or the braking sequence;
- an activation of at least one of a siren or a flashing light mounted on the police vehicle; or
- that a door of the police vehicle has been opened within a first time period after the police vehicle has been stopped.

10. The system of claim 9, wherein the one or more cue words are uttered by the driver into a communications apparatus that is operable to provide communications between the driver and an operator located outside the police vehicle.

11. The system of claim 9, wherein automatically activating, the one or more controls for securing the at least one of the vehicle or the one or more items in the vehicle is in response to one or more signals received from a computer that is located outside the vehicle.

12. A non-transitory computer-readable medium storing computer-executable instructions, that when executed by at least one processor, cause the at least one processor to:
- determine that a driver of a vehicle has bailed out of the vehicle; and
- automatically activate, based at least in part on determining that the driver has bailed out of the vehicle and one or more cue words uttered by the driver, one or more controls for securing at least one of the vehicle or one or more items in the vehicle, wherein the one or more cue words are uttered by the driver into a communications apparatus that is operable to provide communications between the driver and an operator located outside the vehicle.

13. The non-transitory computer-readable medium of claim 12, wherein automatically activating, the one or more controls for securing the at least one of the vehicle or the one or more items in the vehicle comprises at least one of: l
- ogging out of a computer within the vehicle
- locking a first component inside the vehicle; and.
- disabling an operation of at least a second component inside the vehicle, wherein the first component is at least one of a gun vault or a glove compartment, and the second component is at least one of, a trunk release, an engine ignition switch, or a gear shifter.

14. The non-transitory computer-readable medium of claim 12, wherein the vehicle is a police vehicle, and wherein automatically activating the one or more controls for securing the at least one of the vehicle or the one or more items in the vehicle is based in further part on detecting at least one of:
- a first driving pattern comprising an acceleration sequence and a braking sequence of the police vehicle;
- a gear shifting characteristic of the police vehicle during one of the acceleration sequence or the braking sequence;
- an activation of at least one of a siren or a flashing light mounted on the police vehicle; or
- that a door of the police vehicle has been opened within a first time period after the police vehicle has been stopped.

15. The non-transitory computer-readable medium of claim 14, wherein the one or more cue words are uttered by the driver into a communications apparatus that is operable to provide communications between the driver and an operator located outside the police vehicle.

16. The non-transitory computer-readable medium of claim 14, wherein automatically activating the one or more controls for securing the at least one of the vehicle or the one or more items in the vehicle is in response to one or more signals received from a computer that is located outside the police vehicle.

* * * * *